US010849081B2

(12) United States Patent
Wu et al.

(10) Patent No.: US 10,849,081 B2
(45) Date of Patent: Nov. 24, 2020

(54) SYNCHRONIZED RADIO TRANSMISSION FOR VEHICLE PLATOONING

(71) Applicant: QUALCOMM Incorporated, San Diego, CA (US)

(72) Inventors: Zhibin Wu, Bedminster, NJ (US); Shailesh Patil, Raritan, NJ (US); Kapil Gulati, Dover, DE (US); Tien Viet Nguyen, Bridgewater, NJ (US); Sudhir Kumar Baghel, Hillsborough, NJ (US); Junyi Li, Chester, NJ (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 15/636,327

(22) Filed: Jun. 28, 2017

(65) Prior Publication Data

US 2018/0084511 A1  Mar. 22, 2018

Related U.S. Application Data

(60) Provisional application No. 62/395,898, filed on Sep. 16, 2016.

(51) Int. Cl.
*H04W 56/00* (2009.01)
*G08G 1/00* (2006.01)
(Continued)

(52) U.S. Cl.
CPC ........ *H04W 56/001* (2013.01); *G05D 1/0295* (2013.01); *G08G 1/22* (2013.01);
(Continued)

(58) Field of Classification Search
CPC .... B60W 30/16; B60W 30/165; G05D 1/024; G05D 1/0027; G05D 1/028; G05D 1/0278;
(Continued)

(56) References Cited

U.S. PATENT DOCUMENTS 6,611,755 B1 * 8/2003 Coffee et al.
8,352,111 B2 * 1/2013 Mudalige
(Continued)

FOREIGN PATENT DOCUMENTS

EP   1708065 A2   10/2006
EP   2390744 A1   11/2011

OTHER PUBLICATIONS

International Search Report and Written Opinion—PCT/US2017/045455—ISA/EPO—dated Nov. 6, 2017.

*Primary Examiner* — Marsha D Banks Harold
*Assistant Examiner* — Dharmesh J Patel
(74) *Attorney, Agent, or Firm* — Haynes and Boone, LLP

(57) ABSTRACT

Wireless communications systems and methods related to transmission of platoon information. A first vehicle in a vehicle platoon obtains a first radio resource spanning a frequency channel and a time period for synchronous transmission with at least a second vehicle in the vehicle platoon. The first vehicle transmits, synchronously with at least the second vehicle, information associated with the vehicle platoon in the frequency channel and the time period of the first radio resource. The first vehicle may obtain the first radio resource by requesting a transmission request from a wireless communication device and receiving a transmission grant indicating the first radio resource. Alternatively, the first vehicle may obtain the first radio resource by selecting the first radio resource based on at least one of a sensing report or a resource reservation received from the second vehicle.

22 Claims, 13 Drawing Sheets

(51) Int. Cl.
  *H04W 72/04* (2009.01)
  *H04W 4/46* (2018.01)
  *G05D 1/02* (2020.01)
  *H04L 29/08* (2006.01)
  *H04W 72/14* (2009.01)

(52) U.S. Cl.
  CPC ............... *H04L 67/12* (2013.01); *H04W 4/46* (2018.02); *H04W 72/044* (2013.01); *H04W 72/0406* (2013.01); *H04W 72/14* (2013.01); *G05D 2201/0213* (2013.01); *H04W 72/0486* (2013.01)

(58) Field of Classification Search
  CPC ......... G05D 1/0295; G05D 2201/0213; G08G 1/22; G08G 1/091; G08G 1/0112; G08G 1/161; G08G 1/163; G08G 1/0965; G08G 1/096775; G08G 1/096791; G07C 5/008; H04L 67/12; H04W 4/46; H04W 56/001; H04W 72/14; H04W 72/044; H04W 72/0406; H04W 72/0486
  See application file for complete search history.

(56) References Cited

U.S. PATENT DOCUMENTS

2006/0229804 A1* 10/2006 Schmidt et al.
2009/0296680 A1* 12/2009 Suzuki et al.
2014/0286291 A1*  9/2014 Einhaus et al.
2015/0100192 A1*  4/2015 Lee et al.

* cited by examiner

SYNCHRONIZED RADIO TRANSMISSION FOR VEHICLE PLATOONING

CROSS REFERENCE TO RELATED APPLICATIONS

The present application claims priority to and the benefit of the U.S. Provisional Patent Application No. 62/395,898, filed Sep. 16, 2016, which is hereby incorporated by reference in its entirety as if fully set forth below and for all applicable purposes.

TECHNICAL FIELD

The technology discussed in this disclosure relates generally to vehicle platooning, and more particularly to improving reliability of platoon information broadcast. Embodiments can enable and provide vehicles or members of a platoon capable of vehicle-to-vehicle (V2V) and/or vehicle-to-infrastructure (V2I) communications to synchronously transmit platoon-related information, enabling the transmission of the platoon-related information can reach a farther distance.

INTRODUCTION

Platooning is a promising technology for coordinating movements of a group of vehicles to reduce inter-vehicle distances and improve lane capacity in roads and highways. One of the challenges in platooning is reliable vehicle-to-vehicle (V2V) communications. V2V communications allow vehicles to be continuously aware of each other. V2V communications may be based on wireless communications, where vehicles are equipped with radio frequency (RF) transceivers. For example, a vehicle platoon may announce platoon-related information over-the-air and vehicles in surrounding traffic may monitor for the platoon-related information and aware of the vehicle platoon. The platoon information may include the platoon size (e.g., number of vehicles in the platoon), the platoon travelling speed, and/or the inter-vehicle distance in the platoon. Based on the platoon information, the vehicles in the surrounding traffic may avoid cutting into the platoon, which may endanger the safety of platoon operations and may cause traffic accidents.

A platoon may include a leading vehicle followed by a number of vehicles travelling in close proximity to one another and closely matching the speed and maneuvers of the leading vehicle. The vehicles that travel together in a platoon are referred to as members of the platoon. A platoon is typically controlled by the leading vehicle. If the platoon-related information is only transmitted by a leading vehicle, the reliability of the transmission may be limited due to various constraints, such as line-of-sight (LOS), path loss (PL), fading, and/or attenuation. In particular, when the platoon size is large, for example, about 50 to about 60 vehicles, the transmission of the leading vehicle may not be received by traffic behind the platoon. If all the vehicles in the platoon announce the same platoon-related information, the V2V messages are duplicated, resulting in unnecessary bandwidth consumption. Therefore, improving the reliability of platoon-related information transmission may benefit vehicle platooning.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide synchronous radio transmission mechanisms for vehicle platooning. Vehicles or members of a vehicle platoon may synchronously transmit platoon-related information. A leading vehicle of the platoon may coordinate with a network and/or members of the platoon for the synchronous transmission. The synchronous transmission can improve the reception quality of the platoon-related information at other vehicles in surrounding traffic.

For example, in an aspect of the disclosure, a method of wireless communication for vehicle platooning, includes obtaining, by a first vehicle in a vehicle platoon, a first radio resource spanning a frequency channel and a time period for synchronous transmission with at least a second vehicle in the vehicle platoon; and transmitting, by the first vehicle synchronously with at least the second vehicle, information associated with the vehicle platoon in the frequency channel and the time period of the first radio resource.

In an additional aspect of the disclosure, a method of wireless communication for vehicle platooning, includes receiving, by a wireless communication device from a vehicle in a vehicle platoon, a transmission request for synchronous transmission by the vehicle platoon; and transmitting, by the wireless communication device to the vehicle, resource allocation information indicating at least one radio resource having a frequency channel and a time period for the synchronous transmission by the vehicle platoon of information associated with the vehicle platoon.

In an additional aspect of the disclosure, an apparatus associated with a first vehicle in a vehicle platoon, includes a processor configured to obtain a first radio resource spanning a frequency channel and a time period for synchronous transmission with at least a second vehicle in the vehicle platoon; and a transmitter configured to transmit, synchronously with at least the second vehicle, information associated with the vehicle platoon in the frequency channel and the time period of the first radio resource.

In an additional aspect of the disclosure, a wireless communication device, includes a receiver configured to receive, from a vehicle in a vehicle platoon, a transmission request for synchronous transmission by the vehicle platoon; and a transmitter configured to transmit, to the vehicle, resource allocation information indicating at least one radio resource having a frequency channel and a time period for the synchronous transmission by the vehicle platoon of information associated with the vehicle platoon.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
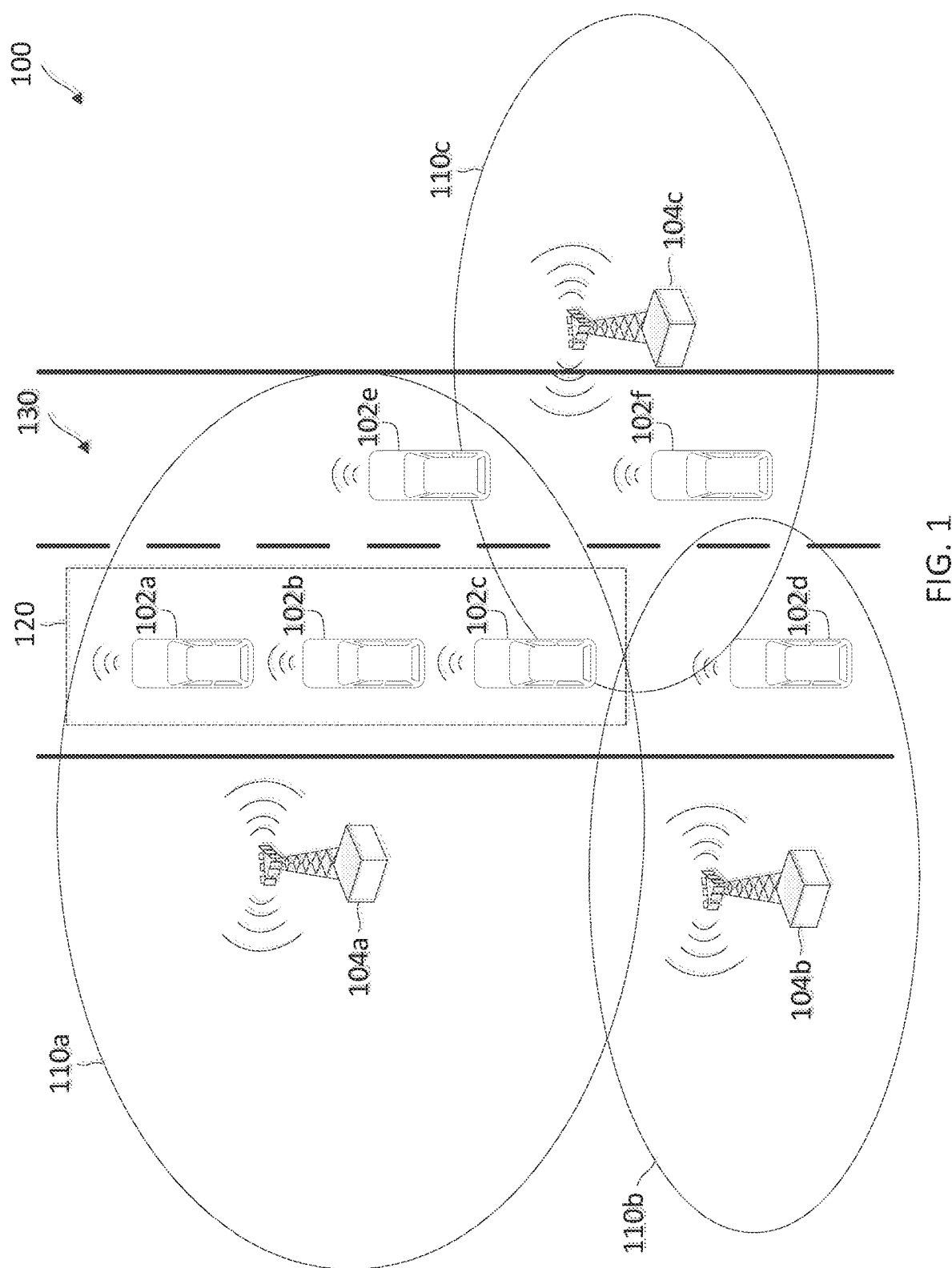
FIG. 1 illustrates a wireless communication network that facilitates vehicle platooning according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may employ various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G)) network.

The present disclosure describes synchronized radio transmission mechanisms for vehicle platooning. In the disclosed embodiments, all vehicles or members of a vehicle platoon synchronously transmit platoon information in the same frequency channel and the same time period. The scheduling of radio resources for the synchronous transmission may be network-assisted or decentralized. The synchronous transmission by all vehicle members enables the platoon information to reach a greater distance. The disclosed embodiments are suitable for use by any platoons for broadcasting information and may benefit large-size platoons, for example, with more than about 50 members. The network-assisted scheduling mechanisms may leverage any suitable wireless communication network protocol, such as LTE. The disclosed embodiments may employ a combination of long-range and short-range wireless technologies for V2V and V2I communications.

FIG. 1 illustrates a wireless communication network 100 that facilitates vehicle platooning according to embodiments of the present disclosure. The network 100 may include a number of vehicles 102 and a number of BSs 104. The BSs 104 may include an Evolved Node B (eNodeB). A BS 104 may be a station that communicates with the vehicles 102 and may also be referred to as a base transceiver station, a node B, an access point, and the like.

The BSs 104 communicate with the vehicles 102. A vehicle 102 may communicate with the BS 104 via an uplink (UL) and a downlink (DL). The downlink (or forward link) refers to the communication link from the BS 104 to the vehicle 102. The UL (or reverse link) refers to the communication link from the vehicle 102 to the BS 104. The BSs 104 may also communicate with one another, directly or indirectly, over wired and/or wireless connections.

The vehicles 102 may be travelling on a roadway 130. The vehicles 102 may travel through different coverage areas or cells 110 in the network 100. The vehicles 102 may have in-vehicle wireless communication devices for communicating with each other and with the BSs 104. The vehicles 102 may have receivers for communication with a global navigation satellite system (GNSS), which may provide accurate location tracking and timing information. The vehicles 102 may have sensors for various sensing, which may be for navigational, safety, and/or performance. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell with varying coverage areas and access restrictions. As shown, the BSs 104a, 104b, and 104c provide communication coverage in the cells 110a, 110b, and 110c, respectively. In some embodiments, a BS 104 may support one or multiple (e.g., two, three, four, and the like) cells.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers (sometimes referred to as tones, bins, or the like). Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In an embodiment, communications in the network 100 may be performed in the form of radio frames. A radio frame may include a plurality of subframes. Each subframe may include a plurality of symbols spanning a frequency band and a time interval. The network 100 may employ various transmission configurations. For example, each radio frame may include one or more subframes for DL transmissions and one or more subframes for UL transmissions.

In an embodiment, the vehicles 102a, 102b, and 102c may be members of a platoon 120. The vehicle 102a may operate as the leader of the platoon 120. For example, the vehicle 102a may control and coordinate the movements of all other members (e.g., the vehicles 102b and 102c). For example, the vehicles 102a, 102b, and 102c in the platoon 120 may travel at the same speed and brake or accelerate together. The vehicles 102a, 102b, and 102c in the platoon 120 may communicate with each other and/or with other vehicles 102 (e.g., the vehicles 102d, 102e, and 102f) in surrounding traffic. The platoon 120 may announce information (e.g., speed, inter-vehicle distances, and/or size) associated with the platoon 120 so that the other vehicles 102 in the surrounding traffic are aware of the platoon 120. When the vehicles 102 travel into a coverage area 110, the vehicles 102 may communicate with a corresponding BS 104 and may utilize services (e.g., resource scheduling) provided by the BS 104. In the network 100, the vehicles 102 may employ various wireless communication technologies. In some embodiments, the network 100 may support LTE-based V2V, LTE-based vehicle-to-infrastructure (V2I), LTE-based device-to-device (D2D), or direct short range communication (DSRC) communications.

Although not shown, the network 100 may further include a number of user equipments (UEs) in communication with the BSs 104. A UE may be a cellular phone, a smartphone, a personal digital assistant, a wireless modem, a laptop computer, a tablet computer, etc. In some embodiments, the UEs and the vehicles 120 may employ a similar initial attachment procedure to communicate initiate communication with the BSs 104. For example, the initial attachment procedure may be similar to the LTE random access procedure.

Figure 2:
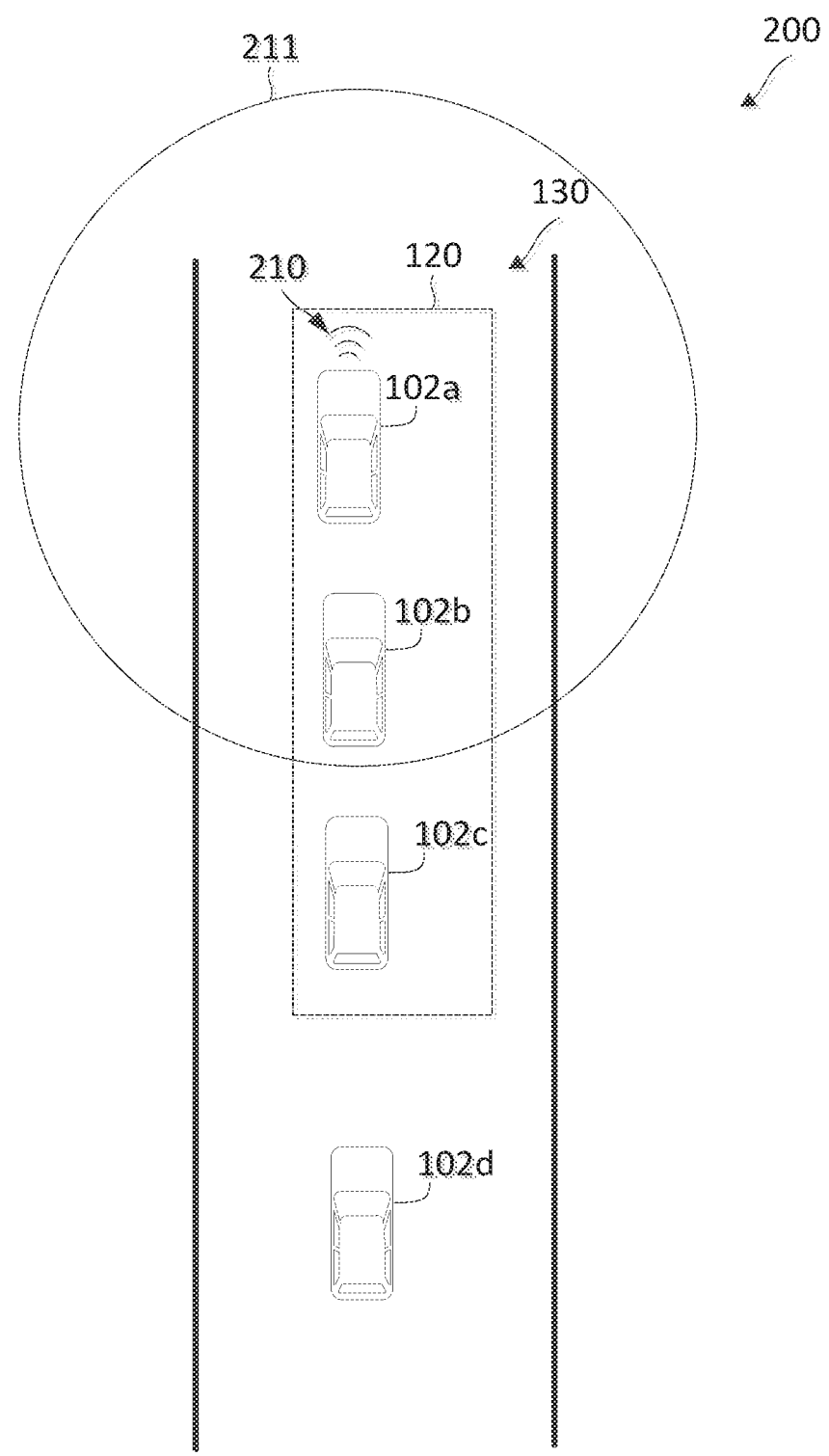
FIG. 2 illustrates a transmission scheme for vehicle platooning according to embodiments of the present disclosure.

FIG. 2 illustrates a transmission scheme 200 for vehicle platooning according to embodiments of the present disclosure. The transmission scheme 200 may be employed by the platoon 120. FIG. 2 illustrates one vehicle 102d travelling behind one platoon 120 with three vehicles 102a, 102b, and 102c for purposes of simplicity of discussion, though it will be recognized that embodiments of the present disclosure may scale to many more platoons 120, many more vehicles 102 within the platoon 120, and/or many more vehicles 102 in surrounding traffic. The vehicles 102 may communicate with each other at any suitable frequencies.

In the scheme 200, the leading vehicle (e.g., the vehicle 102a) of the platoon 120 announces platoon information by transmitting a wireless signal 210 carrying the platoon information, where the signal 210 has a coverage area 211. When the size of a platoon is large, for example, having about 50 to about 60 vehicles, a signal transmitted by a leading vehicle may not reach vehicles behind the platoon. For illustration purpose, the signal 210 transmitted by the leading vehicle 102a cannot reach the vehicle 102d travelling behind the platoon 120. Thus, transmission of platoon information by a single leading vehicle 102a may not be reliable.

Figure 3:
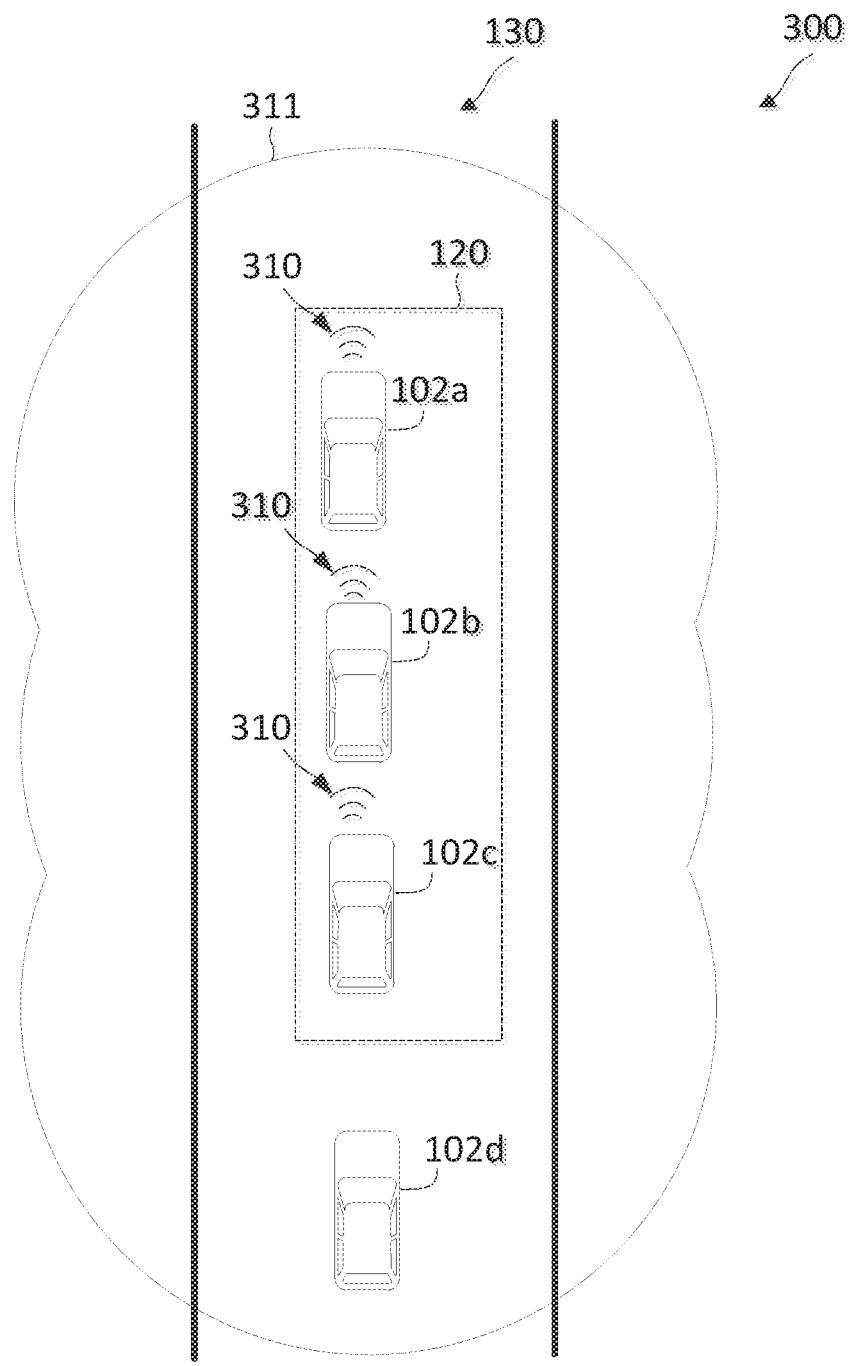
FIG. 3 illustrates a synchronized frequency network (SFN)-based transmission scheme for vehicle platooning according to embodiments of the present disclosure.

FIG. 3 illustrates a SFN-based transmission scheme 300 for vehicle platooning according to embodiments of the present disclosure. The scheme 300 may be used in the network 100. FIG. 3 illustrates one vehicle 102d travelling behind one platoon 120 with three vehicles 102a, 102b, and 102c for purposes of simplicity of discussion, though it will be recognized that embodiments of the present disclosure may scale to many more platoons 120, many more vehicles 102 within the platoon 120, and/or many more vehicles 102 in surrounding traffic. The vehicles 102 may communicate with each other at any suitable frequencies.

In the scheme 300, the leading vehicle 102a of the platoon 120, as well as the following vehicles 102b and 102c performs synchronous transmission of platoon information. All the vehicles 102a, 102b, and 102c in the platoon 120 transmit identical signals 310 carrying identical platoon information in the same frequency channel and the same time period. For example, each of the vehicles 102a, 102b, and 102c generates the identical signal using identical physical layer processing, which may include modulation, error encoding, cyclic redundancy check (CRC) generation, scrambling, and addition of reference signals and/or pilot signals. The synchronous transmission of platoon information by all vehicles in a platoon may provide a sufficient coverage to reach vehicles travelling behind the platoon. For illustration purpose, the signals 310 transmitted by all the vehicles 102a, 102b, and 102c in the platoon 120 provide a coverage area 311, reaching the vehicle 102d travelling behind the platoon 120. As such, synchronous broadcast of platoon information can be received at a distance further away from the platoon 120, and thus improving reliability and road safety.

In an embodiment, the leading vehicle 102a may identify a radio resource (e.g., time-frequency slots) for the synchronous transmission. The leading vehicle 102a may notify the following vehicles 102b and 102c of the identified radio resource via inter-vehicle communication (IVC). Subsequently, all vehicles 102a, 102b, and 102c in the platoon may synchronously transmit the platoon information on the identified radio resource. In some embodiments, the platoon information may be announced periodically. For example, a particular frequency channel may be used periodically for the synchronous transmission.

To synchronously transmit at the exact time, the vehicles 102a, 102b, and 102c may receive timing information from a GNSS and synchronize corresponding clock timing to the GNSS timing. For example, the radio resource may be indicated in the form of a frequency band, a timing offset from a reference time, and/or a periodicity. The identification of the radio resource for the synchronous transmission may be network-assisted (e.g., allocated by the BS 104) or decentralized (e.g., determined by the vehicle 102a). Network-assisted resource scheduling may be more reliable, whereas decentralized resource scheduling may have less overhead and may be used in areas without network coverage, but may result in collisions. The resource scheduling or selection mechanisms are described in greater detail herein.

Figure 4:
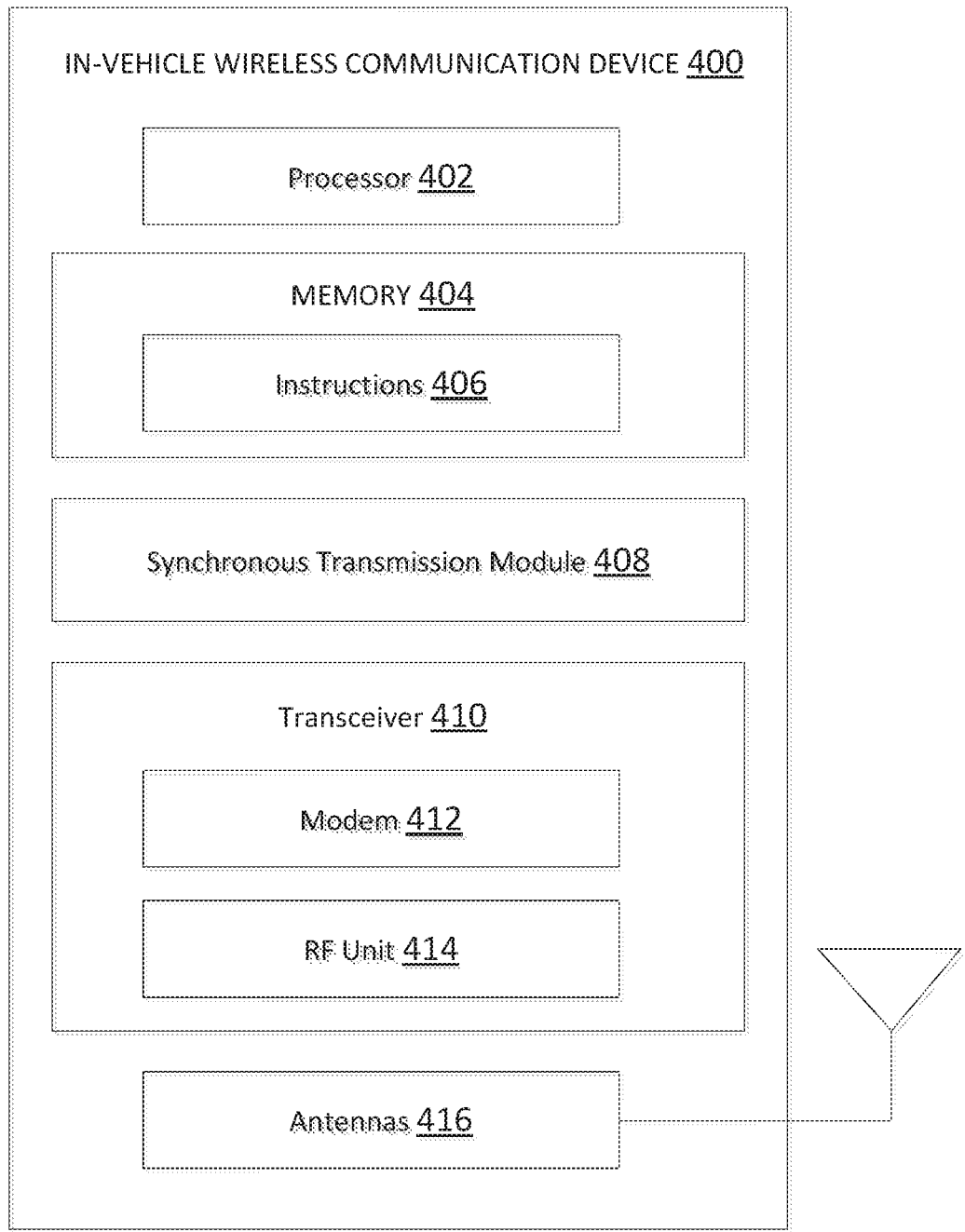
FIG. 4 is a block diagram of an exemplary in-vehicle wireless communication device according to embodiments of the present disclosure.

FIG. 4 is a block diagram of an exemplary in-vehicle wireless communication device 400 according to embodiments of the present disclosure. The in-vehicle wireless communication device 400 may be located in the vehicles 102 as discussed above. As shown, the in-vehicle wireless communication device 400 may include a processor 402, a memory 404, a synchronous transmission module 408, a transceiver 410 including a modem subsystem 412 and a radio frequency (RF) unit 414, an antenna 416, and sensors. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the vehicles 102 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The synchronous transmission module 408 may be used for various aspects of the present disclosure. For example, the synchronous transmission module 408 is configured to obtain, identify, select, and/or reserve radio resources for synchronous transmission of platoon information and perform channel sensing and synchronous transmission of platoon information, as described in greater detail herein.

As shown, the transceiver 410 may include the modem subsystem 412 and the RF unit 414. The transceiver 410 can be configured to communicate bi-directionally with other devices, such as the BSs 104, 204, and 304. The modem subsystem 412 may be configured to modulate and/or encode the data from the memory 404 and/or the synchronous transmission module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a vehicle 102 or a BS 104. The RF unit 414 may be further configured to perform analog beamforming in conjunction with the digital beamforming. Although shown as integrated together in transceiver 410, the modem subsystem 412 and the RF unit 414 may be separate devices that are coupled together at the vehicle 102 to enable the vehicle 102 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of transmission request, resource allocation information, and platoon information according to embodiments of the present disclosure. The antenna 416 may further receive data messages transmitted from other devices. This may include, for example, reception of a transmission grant or messages from other vehicles 102 according to embodiments of the present disclosure. The antenna 416 may provide the received data messages for processing and/or demodulation at the transceiver 410. Although FIG. 4 illustrates antenna 416 as a single antenna, antenna 416 may include multiple antennas of similar or different designs in order to sustain multiple transmission links. The RF unit 414 may configure the antenna 416

Figure 5:
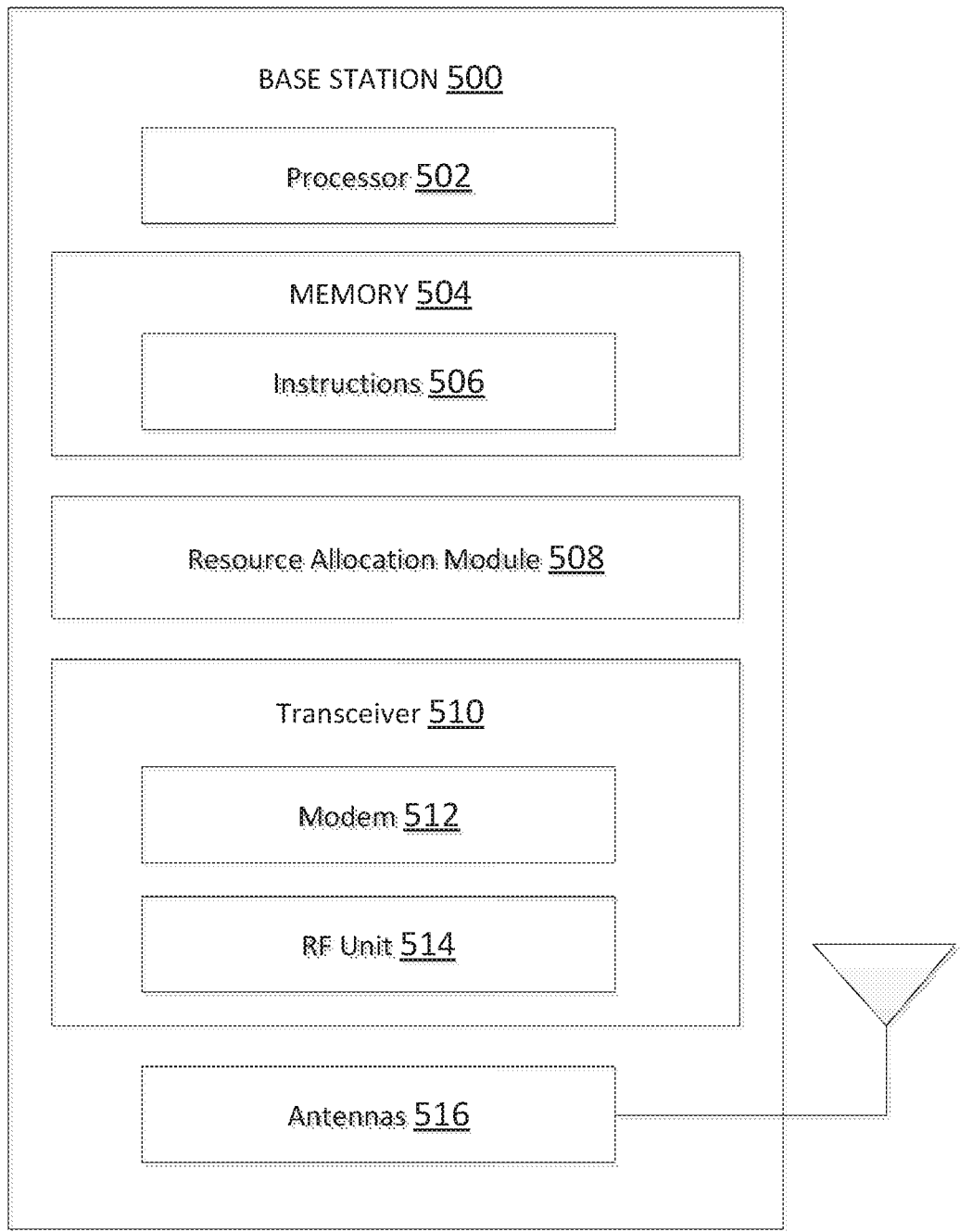
FIG. 5 illustrates a block diagram of an exemplary base station (BS) according to embodiments of the present disclosure.

FIG. 5 illustrates a block diagram of an exemplary BS 500 according to embodiments of the present disclosure. The BS 500 may be a BS 104 as discussed above. A shown, the BS 500 may include a processor 502, a memory 504, a resource allocation module 508, a transceiver 510 including a modem subsystem 512 and a RF unit 514, and an antenna 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 4.

The resource allocation module 508 may be used for various aspects of the present disclosure. For example, the resource allocation module 508 may allocate resources, dedicated or semi-persistent, for synchronous transmission of platoon information as described in greater detail herein.

As shown, the transceiver 510 may include the modem subsystem 512 and the RF unit 514. The transceiver 510 can be configured to communicate bi-directionally with other devices, such as the UEs 102, 202, and 302 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a vehicle 102. Although shown as integrated together in transceiver 510, the modem subsystem 512 and the RF unit 514 may be separate devices that are coupled together at the BS 104 to enable the BS 104 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of information to complete attachment to a network and communication with a camped vehicle 102 according to embodiments of the present disclosure. The antenna 516 may further receive data messages transmitted from other devices and provide the received data messages for processing and/or demodulation at the transceiver 510. Although FIG. 5 illustrates antenna 516 as a single antenna, antenna 516 may include multiple antennas of similar or different designs in order to sustain multiple transmission links.

Figure 6:
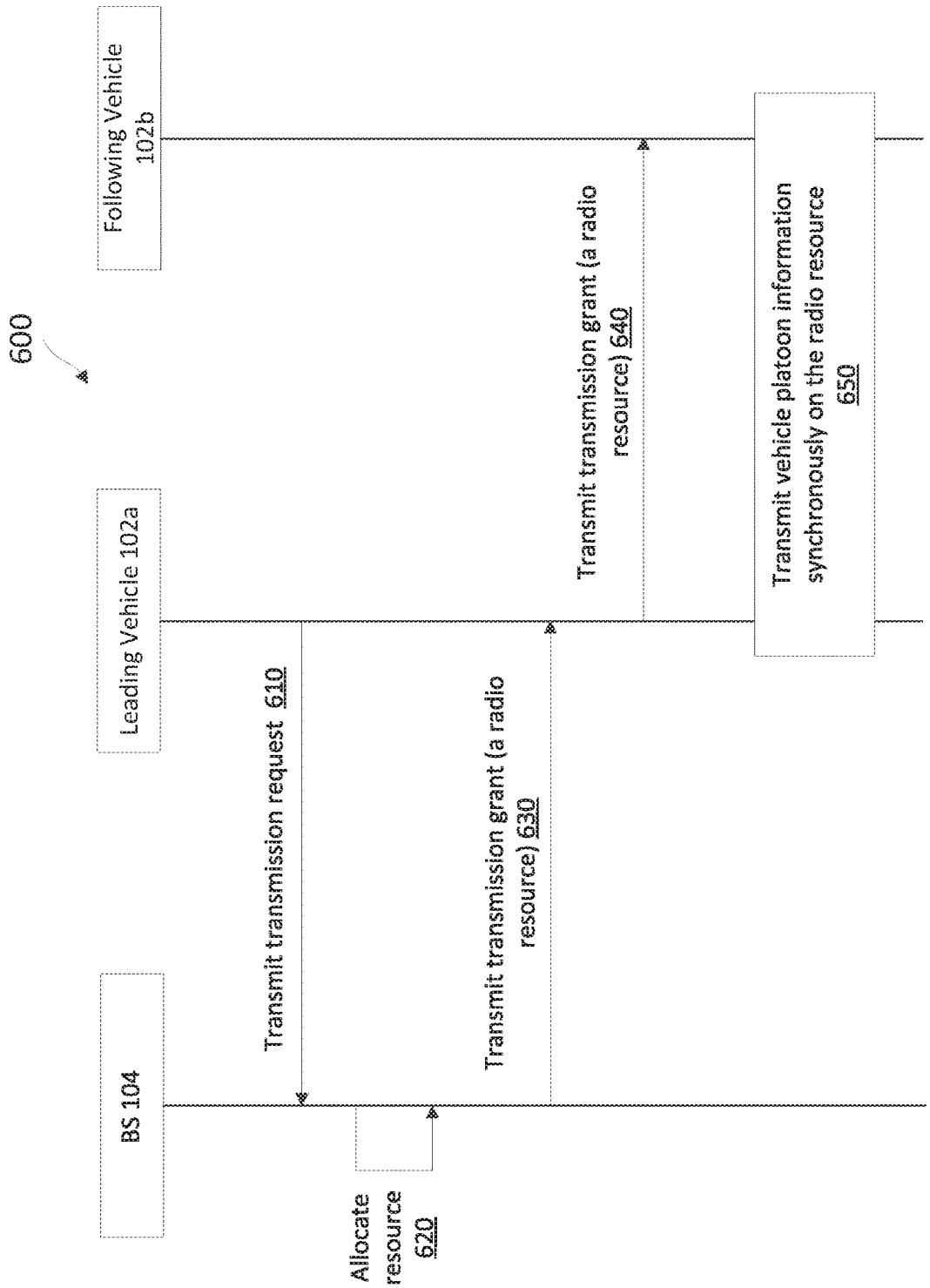
FIG. 6 is a protocol diagram of a method of network-assisted scheduling for synchronous transmission of platoon information according to embodiments of the present disclosure.

FIG. 6 is a protocol diagram of a method 600 of network-assisted scheduling for synchronous transmission of platoon information according to embodiments of the present disclosure. Steps of the method 600 can be executed by computing devices (e.g., a processor, processing circuit, and/or other suitable component) of wireless communication devices, such as the BSs 104 and 500 and the vehicles 102 and the in-vehicle wireless communication device 400. The method 600 can be better understood with reference to FIG. 3. The method 600 may employ similar mechanism as described in the scheme 300. As illustrated, the method 600 includes a number of enumerated steps, but embodiments of the method 600 may include additional steps before, after, and in between the enumerated steps. In some embodiments, one or more of the enumerated steps may be omitted or performed in a different order. The method 600 illustrates one BS 104, one leading vehicle 102a of the platoon 120, and one following vehicle 102b of the platoon 120 for purposes of simplicity of discussion, though it will be recognized that embodiments of the present disclosure may scale to many more vehicles 102 and/or BSs 104.

At step 610, the leading vehicle 102a transmits a transmission request to the BS 104 requesting a resource for synchronous transmission of platoon information. For example, the leading vehicle 102a has established a connection with the BS 104. The transmission request may be similar to a LTE scheduling request. For example, the transmission request may indicate the size of the platoon information.

At step 620, the BS 104 allocates a resource for the synchronous transmission based on the transmission request. The allocated resource may span a frequency band and a time interval. At step 630, the BS 104 transmits a transmission grant to the leading vehicle 102a indicating the allocated radio resource. The transmission grant may indicate the radio resource in various forms, for example, in terms of frequency bands, time offset from a reference time, resource block indices, and/or frame number.

At step 640, the leading vehicle 102a transmits the transmission grant to the following vehicle 102b. At step 650, the leading vehicle 102a and the following vehicle 102b synchronously transmit the platoon information on the allocated resource. For example, the leading vehicle 102a and the following vehicle 102b generate identical signals carrying identical platoon information and synchronously transmit the identical signals in the same frequency band and the same time interval of the allocated resource.

In some embodiments, the BS 104 may allocate a dedicated resource, semi-persistent scheduling (SPS) resources, or a pool of resources for the synchronous transmission at the step 620. The dedicated resource may be for a single synchronous transmission. The SPS resources may include a frequency channel allocated periodically over a duration. Thus, the vehicles 102a and 102b may broadcast the platoon information periodically using the SPS resources. The pool of resources may be reserved for synchronous and/or non-synchronous transmissions of platoon information, but may be shared among a number of platoons. Thus, upon receiving resource allocation indicating a reserved resource pool, the leading vehicle 102a may select a radio resource from the reserved resource pool for the synchronous transmission. However, collisions may occur due to the sharing with other platoons. One approach to reducing collisions is to perform collision-sensing prior to transmission. Another approach may be to apply hashing for the selection.

Figure 7:
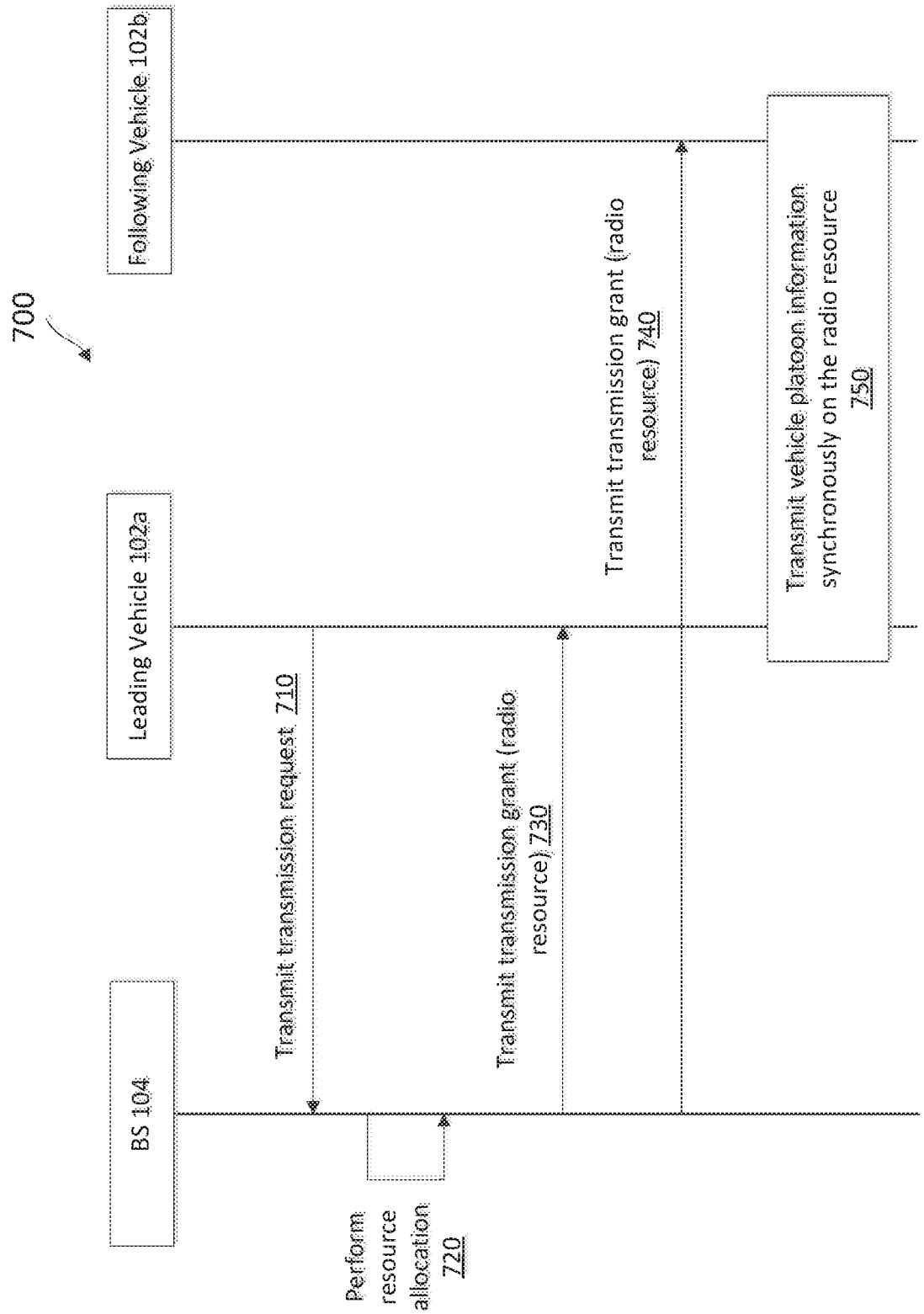
FIG. 7 is a protocol diagram of a method of network-assisted scheduling for synchronous transmission of platoon information according to embodiments of the present disclosure.

FIG. 7 is a protocol diagram of a method 700 of network-assisted scheduling for synchronous broadcast of platoon information according to embodiments of the present disclosure. Steps of the method 700 can be executed by computing devices (e.g., a processor, processing circuit, and/or other suitable component) of wireless communication devices, such as the BSs 104 and 500 and the vehicles 102 and the in-vehicle wireless communication device 400. The method 700 can be better understood with reference to FIG. 3. The method 700 may employ similar mechanism as described in the scheme 300 and the method 600. As illustrated, the method 700 includes a number of enumerated steps, but embodiments of the method 700 may include additional steps before, after, and in between the enumerated steps. In some embodiments, one or more of the enumerated steps may be omitted or performed in a different order. The method 700 illustrates one BS 104, one leading vehicle 102a of the platoon 120, and one following vehicle 102b of the platoon 120 for purposes of simplicity of discussion, though it will be recognized that embodiments of the present disclosure may scale to many more vehicles 102 and/or BSs 104.

At step 710, the leading vehicle 102a transmits a transmission request to the BS 104 requesting a resource for synchronous transmission of platoon information.

At step 720, the BS 104 allocates a resource (e.g., time-frequency slots) for the synchronous transmission based on the transmission request. At step 730, the BS 104 transmits a transmission grant to the leading vehicle 102a indicating the allocated radio resource. At step 740, the BS 104 transmits the transmission grant to the following vehicle 102a indicating the allocated radio resource.

At step 750, the leading vehicle 102a and the following vehicle 102b synchronously transmit the platoon information on the allocated resource.

In some embodiments, to increase reliability, the BS 104 may send the transmission grant to all vehicles 102 in the platoon 120 and the leading vehicle 102a may forward the transmission grant to all following vehicles 102. In such embodiments, when the following vehicle 102b receives both a first transmission grant from the BS 104 and a second transmission grant from the leading vehicle 102a, the following vehicle 102b may verify that the first transmission grant and the second transmission grant indicate the same radio resource. When the first transmission grant and the second transmission grant indicates different radio resources, the following vehicle 102b may select the second transmission grant received from the leading vehicle 102a for the synchronous transmission.

Figure 8:
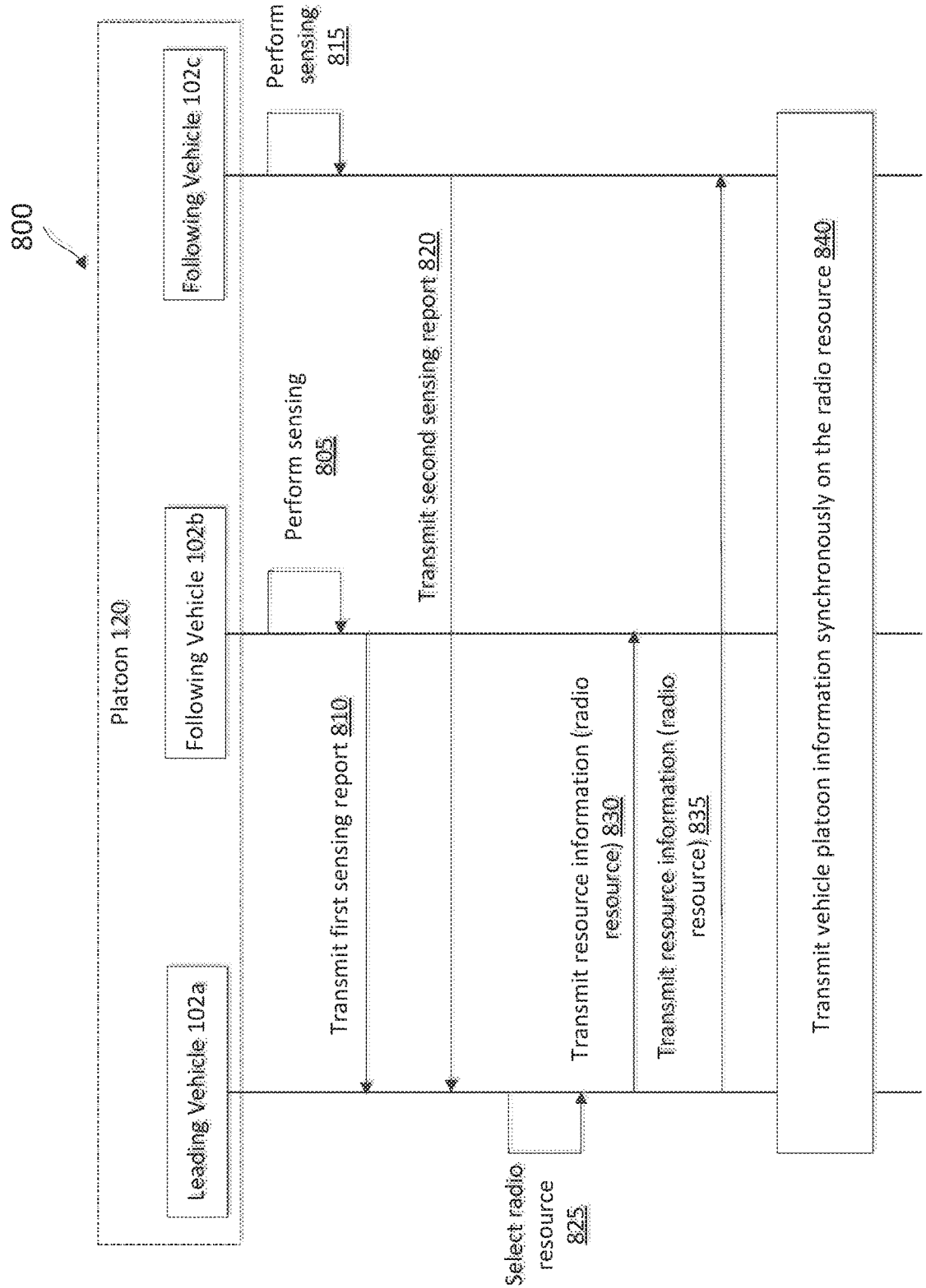
FIG. 8 is a protocol diagram of a method of decentralized scheduling for synchronous transmission of platoon information according to embodiments of the present disclosure.

FIG. 8 is a protocol diagram of a method 800 of decentralized scheduling for synchronous transmission of platoon information according to embodiments of the present disclosure. Steps of the method 800 can be executed by computing devices (e.g., a processor, processing circuit, and/or other suitable component) of wireless communication devices, such as the BSs 104 and 500 and the vehicles 102 and the in-vehicle wireless communication device 400. The method 800 can be better understood with reference to FIG. 3. The method 800 may employ similar mechanism as described in the scheme 300. As illustrated, the method 800 includes a number of enumerated steps, but embodiments of the method 800 may include additional steps before, after, and in between the enumerated steps. In some embodiments, one or more of the enumerated steps may be omitted or performed in a different order. The method 800 illustrates one leading vehicle 102a and two following vehicles 102b and 102c of the platoon 120 for purposes of simplicity of discussion, though it will be recognized that embodiments of the present disclosure may scale to many more following vehicles 102 or platoon members.

At step 805, the following vehicle 102b performs sensing. For example, the following vehicle 102b may detect a number of channels, where some channels may be busy or heavily loaded and some channels may have lighter loading. At step 810, the following vehicle 102b transmits a first sensing report to the leading vehicle 102a. For example, the first sensing report includes a channel bit-map indicating whether each detected channel is busy.

Similarly, at step 815, the following vehicle 102c performs sensing. At step 820, the following vehicle 102c transmits a second sensing report to the leading vehicle 102a indicating channel statuses.

At step 825, the leading vehicle 102a selects a radio resource for synchronous transmission of platoon information based on the first sensing report and the second sensing report. For example, the leading vehicle 102a may select a channel that is suitable (e.g., not busy) for all members of the platoon 120.

At steps 830, the leading vehicle 102a transmits resource information indicating the selected radio resource to the following vehicle 102b. Similarly, at step 835, the leading vehicle 102a transmits the resource information to the following vehicle 102c. At step 840, the leading vehicle 102a and the following vehicles 102b and 102c synchronously transmit the platoon information on the selected radio resource.

Figure 9:
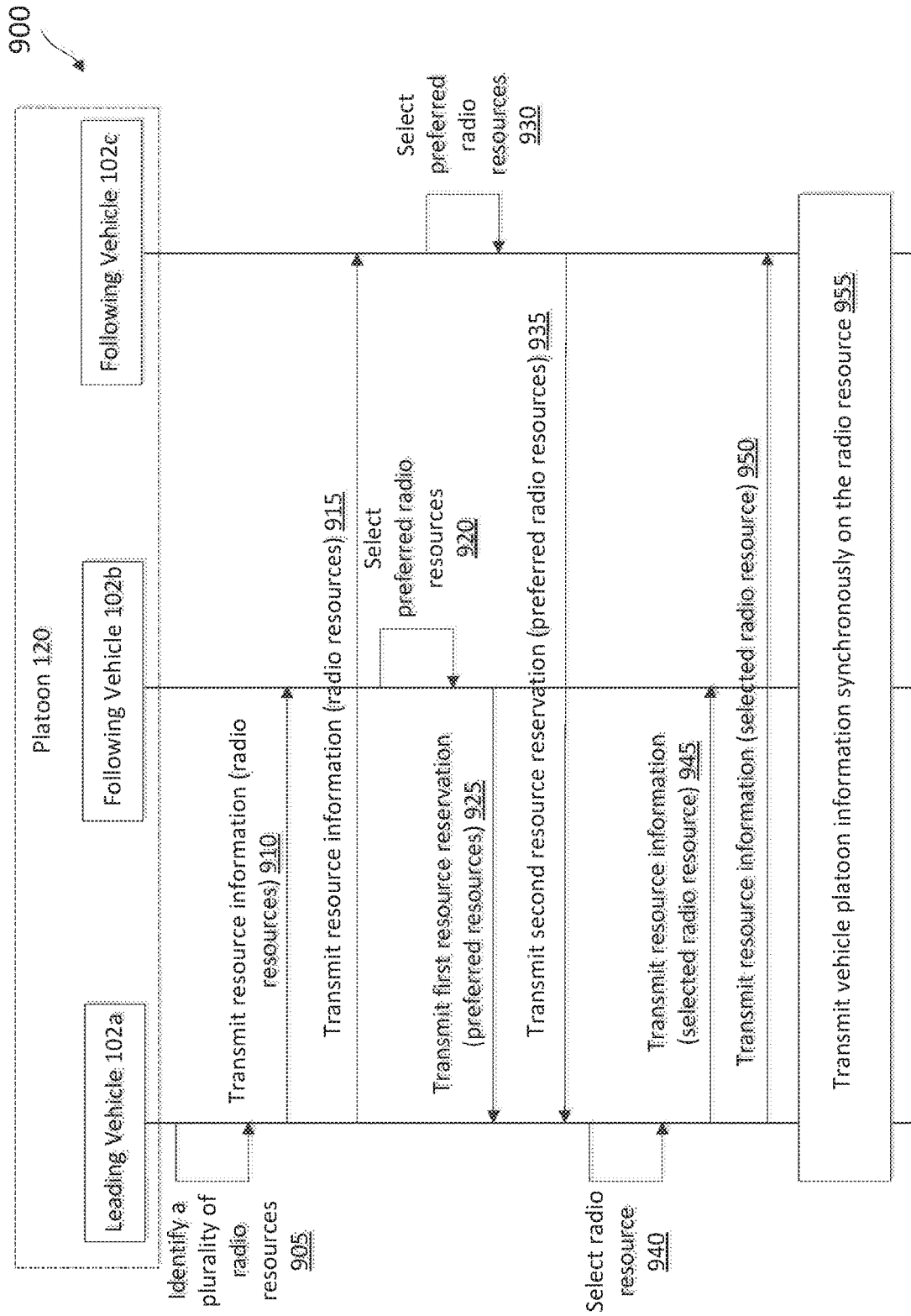
FIG. 9 is a protocol diagram of a method of decentralized scheduling for synchronous transmission of platoon information according to embodiments of the present disclosure.

FIG. 9 is a protocol diagram of a method 900 of decentralized scheduling for synchronous transmission of platoon information according to embodiments of the present disclosure. Steps of the method 900 can be executed by computing devices (e.g., a processor, processing circuit, and/or other suitable component) of wireless communication devices, such as the BSs 104 and 500 and the vehicles 102 and the in-vehicle wireless communication device 400. The method 800 can be better understood with reference to FIG. 3. The method 900 may employ similar mechanism as described in the scheme 300. As illustrated, the method 900 includes a number of enumerated steps, but embodiments of the method 900 may include additional steps before, after, and in between the enumerated steps. In some embodiments, one or more of the enumerated steps may be omitted or performed in a different order. The method 900 illustrates one leading vehicle 102a and two following vehicles 102b and 102c of the platoon 120 for purposes of simplicity of discussion, though it will be recognized that embodiments of the present disclosure may scale to many more following vehicles 102 or platoon members.

At step 905, the leading vehicle 102a identifies a plurality of resources for synchronous transmission of platoon information. In an embodiment, the plurality of resources may be SPS resources.

At step 910, the leading vehicle 102a sends resource information indicating the identified resources to the following vehicle 102b. Similarly, at step 915, the leading vehicle 102a sends resource information to the following vehicle 102c.

At step 920, in response to the resource information, the following vehicle 102b selects one or more preferred resources from the resources indicated in the resource information. For example, the vehicle 102b may select the preferred resources in the channels with less interference from surrounding traffic. At step 925, the following vehicle 102b sends a first in-advance resource reservation to the leading vehicle 102a, where the first in-advance resource reservation indicates the resources preferred by the following vehicle 102b.

Similarly, at step 930, in response to the resource information, the following vehicle 102c selects one or more preferred resources from the resources indicated in the resource information. At step 935, the following vehicle 102c sends a second in-advance resource reservation to the leading vehicle 102a, where the second in-advance resource reservation indicates the resources preferred by the following vehicle 102c.

At step 940, the leading vehicle 102*a* selects a resources based on the first in-advance reservation and the second in-advance reservation. For example, the leading vehicle 102*a* may select a channel that is suitable (e.g., less interference) for all members of the platoon 120.

At step 945, the leading vehicle 102*a* transmits resource information indicating the selected radio resource to the following vehicle 102*b*. At step 950, the leading vehicle 102*a* transmits the resource information to the following vehicle 102*c*. At step 955, the leading vehicle 102*a* and the following vehicles 102*b* and 102*c* synchronously transmit the platoon information on the selected radio resource. In some embodiments, the leading vehicle 102*a* may select SPS resources for the synchronous transmission and all members of the platoon 120 may synchronously transmit the platoon information on each of the SPS resource.

In the methods 800 and 900, where decentralized scheduling is used, the leading vehicle 102*a* may randomly select a radio resource, and thus the selected source may be used by another platoon 120 or vehicle 102 outside the platoon 120. As such, the synchronous transmission may experience collisions. To improve the reliability, the leading vehicle 102*a* may use a predetermined pseudo random sequence to determine the radio resource for the synchronous transmission.

Figure 10:
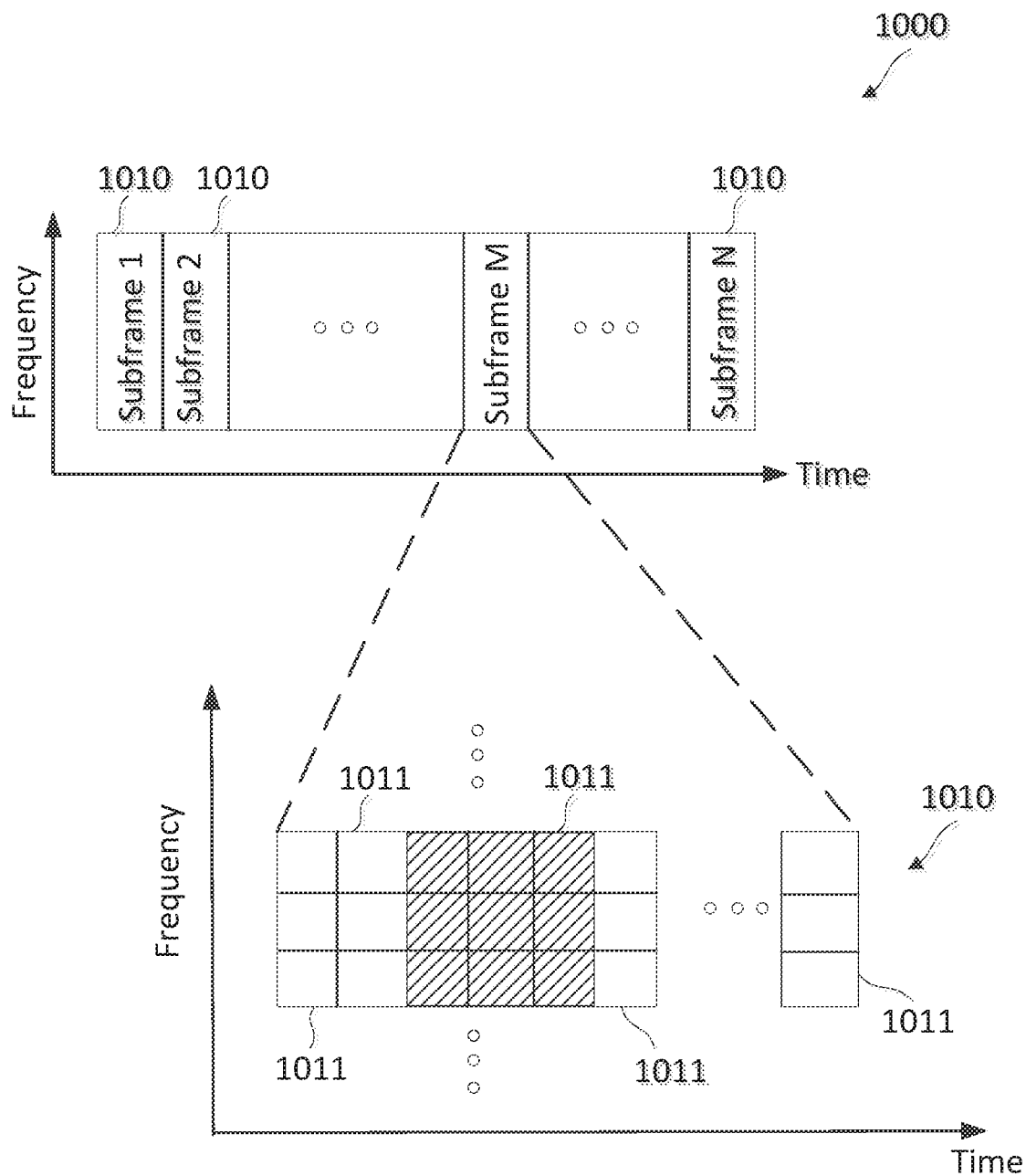
FIG. 10 illustrates a radio frame according to embodiments of the present disclosure.

FIG. 10 illustrates a radio frame 1000 according to embodiments of the present disclosure. The radio frame 1000 may be employed by the network 100, the schemes 200 and 300, and the methods 500-900. In particular, the BSs 104 and the vehicles 102 may exchange data using the radio frame 1000. In FIG. 10, the x-axes represent time in some constant units and the y-axes represent frequency in some constant units. The radio frame 1000 includes N plurality of subframes 1010 spanning in time and frequency. In an embodiment, a radio frame 1000 may span a time interval of about 10 milliseconds (ms). Each subframe 1010 includes a plurality of time-frequency resource blocks 1011. The BS 104 may allocate one or more of the resource blocks 1011 for members (e.g., the vehicles 102*a*, 102*b*, and 102*c*) of the platoon 120 to synchronously broadcast platoon information. For example, a subset of the resource blocks 1011 in the M$^{th}$ subframe 1010 is allocated for the synchronous transmission, as shown by the patterned boxes.

Figure 11:
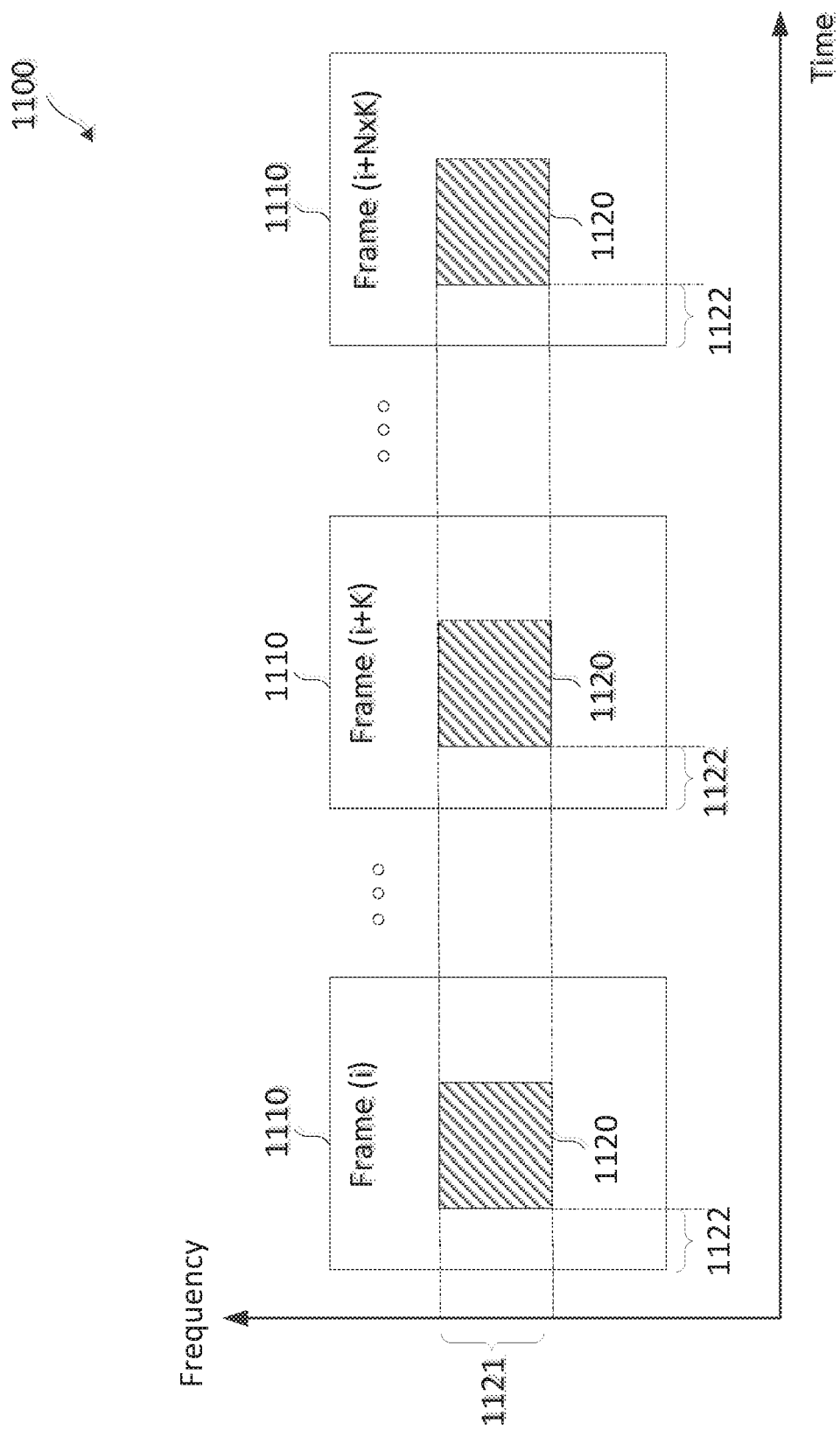
FIG. 11 illustrates a semi-persistent schedule according to embodiments of the present disclosure.

FIG. 11 illustrates a semi-persistent schedule 1100 according to embodiments of the present disclosure. The schedule 1100 may be employed by the network 100, the schemes 200 and 300, and the methods 500-900. In particular, the BSs 104 or the leading vehicle 102*a* may select the schedule 1100 for the platoon 120 to synchronously transmit platoon information. In FIG. 11, the x-axis represent time in some constant units and the y-axis represent frequency in some constant units. The schedule 1100 allocates a repeating resource 1120 for the platoon to periodically announce platoon information. For example, a resource 1120 is allocated with a period of K frames 1100 and repeats N times. The frames 1100 may be similar to the radio frame 1000 and the resource 1120 may include one or more resource blocks similar to the resource blocks 1011. The resource 1120 in each allocated frame 1110 spans the same frequency band 1121 and has the same time-offset 1122 from the beginning of the frame 1110. As shown, the resources 1120 are allocated in the i$^{th}$ frame 1110 and subsequently every K$^{th}$ frame 1110 until the (i+N×K)$^{th}$ frame 1110.

Figure 12:
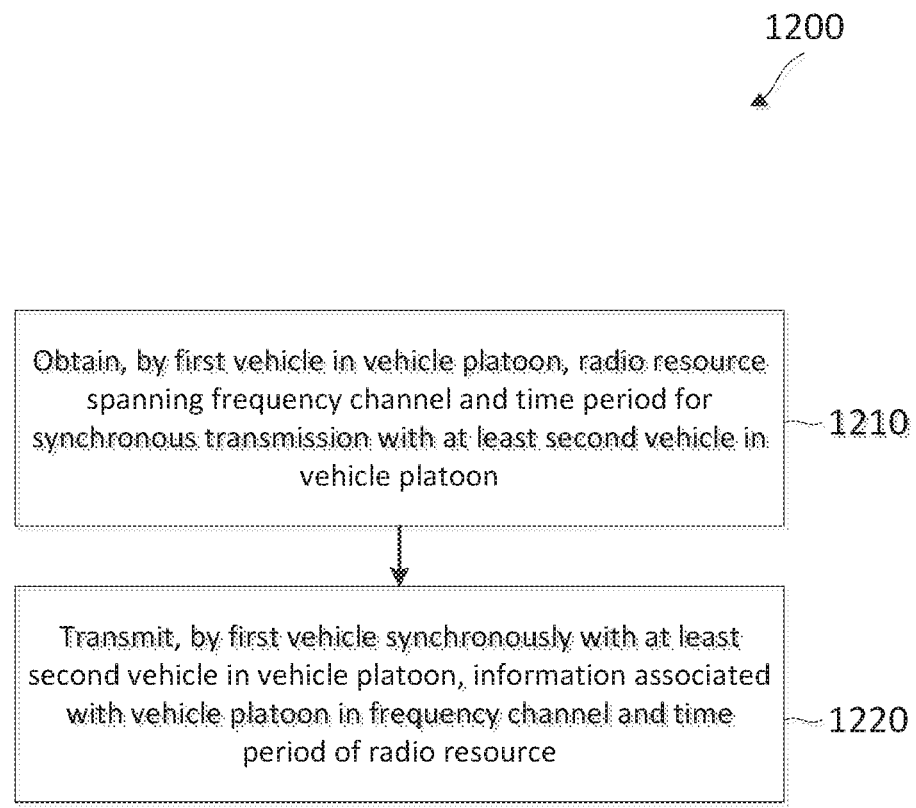
FIG. 12 is a flow diagram of a method of platoon information transmission according to embodiments of the present disclosure.

FIG. 12 is a flow diagram of a method 1200 of platoon information transmission according to embodiments of the present disclosure. Steps of the method 1200 can be executed by a computing device (e.g., a processor, processing circuit, and/or other suitable component) of a wireless communication device, such as the vehicles 102 and the in-vehicle wireless communication device 400. The method 1200 may employ similar mechanisms as in the scheme 300 described with respect to FIG. 3 and the methods 600-900. The method 1200 can be better understood with reference to FIGS. 1 and 3. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes obtaining, by a first vehicle (e.g., the vehicle 102*a*) in a vehicle platoon (e.g., the platoon 120), a radio resource (e.g., the resource blocks 1011 and resource 1120) spanning a frequency channel and a time period for synchronous transmission with at least a second vehicle (e.g., the vehicle 102*b*) in the platoon. The first vehicle may obtain the radio resource using network-assisted scheduling as described in the method 600 or 700 or decentralized scheduling as described in the method as described in the method 800 and 900.

At step 1220, the method 1200 includes transmitting, by the first vehicle synchronously with at least the second vehicle in the platoon, information (e.g., speed, platoon size, and/or inter-vehicle distances) associated with the vehicle platoon in the frequency channel and the time period of the radio resource.

Figure 13:
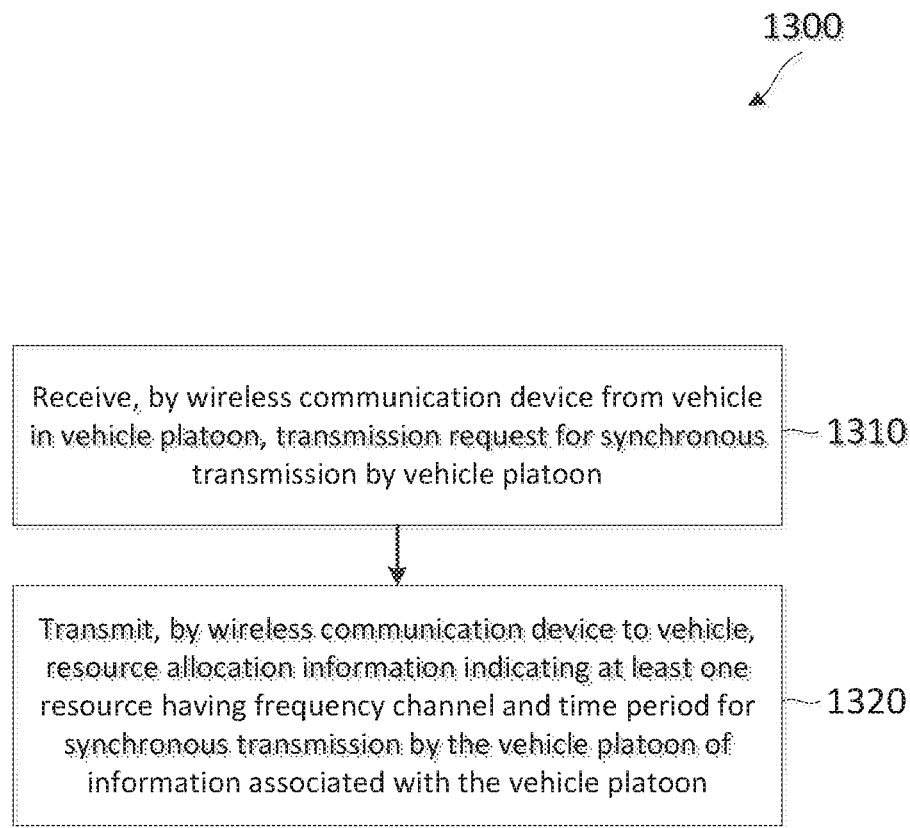
FIG. 13 is a flow diagram of a method of platoon information transmission according to embodiments of the present disclosure.

FIG. 13 is a flow diagram of a method 1300 of platoon information transmission according to embodiments of the present disclosure. Steps of the method 1300 can be executed by a computing device (e.g., a processor, processing circuit, and/or other suitable component) of a wireless communication device, such as the BS 104 and 500. The method 1300 may employ similar mechanisms as in the scheme 300 described with respect to FIG. 3 and the methods 600 and 700. The method 1300 can be better understood with reference to FIGS. 1 and 3. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes receiving, by a wireless communication device (e.g., the BS 104) from a vehicle (e.g., the vehicle 102*a*) in a vehicle platoon (e.g., the platoon 120), a transmission request for synchronous transmission by the vehicle platoon.

At step 1320, the method 1300 includes transmitting, by the wireless communication device to the vehicle, resource allocation information indicating at least one resource (e.g., the resource blocks 1011 and the resource 1120) having a frequency channel and a time period for the synchronous transmission by the vehicle platoon of information associated with the vehicle platoon. For example, the first wireless communication device may allocate a dedicated radio resource, SPS resources, or a pre-configured pool of resources shared among a plurality of platoons. The first wireless communication device may transmit the resource allocation information to all members of the vehicle platoon. Accordingly, in some instances, the wireless communication device may configure the resource allocation information to indicate dedicated radio resource, the SPS resources, or the pre-configured pool of resources.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a method comprising obtaining, by a first vehicle in a vehicle platoon, a first radio resource spanning a frequency channel and a time period for synchronous transmission with at least a second vehicle in the vehicle platoon. The method further includes transmitting, by the first vehicle synchronously with at least the second vehicle, information associated with the vehicle platoon in the frequency channel and the time period of the first radio resource.

The method further includes wherein the obtaining the first radio resource includes transmitting, to a wireless communication device, a transmission request for the synchronous transmission, and receiving, from the wireless communication device, a transmission grant indicating the first radio resource. The method further includes wherein the transmission grant further indicates a semi-persistent schedule for the first radio resource. The method further includes wherein the obtaining the first radio resource includes receiving, from a wireless communication device, resource allocation information indicating a plurality of radio resources reserved for vehicle platooning transmissions, and selecting the first radio resource from the plurality of radio resources. The method further includes receiving, by the first vehicle from the second vehicle, a sensing report including channel loading information associated with the second vehicle, wherein the obtaining the first radio resource includes selecting the first radio resource based on at least the sensing report. The method further includes wherein the obtaining the first radio resource includes identifying, by the first vehicle, a plurality of resources for the synchronous transmission, transmitting, by the first vehicle to the second vehicle, resource information associated with the plurality of resources, receiving, by the first vehicle from the second vehicle, a resource reservation indicating at least a first resource of the plurality of resources, and selecting, by the first vehicle, the first radio resource from the plurality of resources based on at least the resource reservation. The method further includes transmitting, by the first vehicle to the second vehicle, a transmission grant indicating the first radio resource. The method further includes wherein the information associated with the vehicle platoon includes at least one of a travelling speed of the vehicle platoon or an inter-vehicle distance of the vehicle platoon. The method further includes wherein the transmitting the information includes transmitting, by the first vehicle synchronously with the second vehicle, an identical encoded signal carrying identical information on the first radio resource.

Embodiments of the present disclosure further include a method comprising receiving, by a wireless communication device from a vehicle in a vehicle platoon, a transmission request for synchronous transmission by the vehicle platoon. The method further includes transmitting, by the wireless communication device to the vehicle, resource allocation information indicating at least one radio resource having a frequency channel and a time period for the synchronous transmission by the vehicle platoon of information associated with the vehicle platoon.

The method further includes wherein the at least one radio resource is a dedicated resource for the synchronous transmission. The method further includes wherein the resource allocation information further indicates a semi-persistent schedule for the synchronous transmission. The method further includes wherein the resource allocation information further indicates a pool of radio resources reserved for any vehicle platooning transmission. The method further includes wherein the vehicle is a leading vehicle of the vehicle platoon. The method further includes transmitting, by the wireless communication device to at least one other vehicle in the vehicle platoon, the resource allocation information.

Embodiments of the present disclosure further include an apparatus associated with a first vehicle in a vehicle platoon, comprising a processor configured to obtain a first radio resource spanning a frequency channel and a time period for synchronous transmission with at least a second vehicle in the vehicle platoon. The apparatus further includes a transmitter configured to transmit, synchronously with at least the second vehicle, information associated with the vehicle platoon in the frequency channel and the time period of the first radio resource.

The apparatus further includes a receiver, wherein the processor is further configured to obtain the first radio resource by transmitting, via the transmitter to a wireless communication device, a transmission request for the synchronous transmission, and receiving, via the receiver from the wireless communication device, a transmission grant indicating the first radio resource. The apparatus further includes wherein the transmission grant further indicates a semi-persistent schedule for the first radio resource. The apparatus further includes a receiver, wherein the processor is further configured to obtain the first radio resource by receiving, via the receiver from a wireless communication device, resource allocation information indicating a plurality of radio resources reserved for vehicle platooning transmissions, and selecting the first radio resource from the plurality of radio resources. The apparatus further includes a receiver configured to receive, from the second vehicle, a sensing report including channel loading information associated with the second vehicle, wherein the processor is further configured to obtain the first radio resource by selecting the first radio resource based on at least the sensing report. The apparatus further includes wherein the processor is further configured to obtain the first radio resource by identifying a plurality of resources for the synchronous transmission, transmitting, via the transmitter to the second vehicle, resource information associated with the plurality of resources, receiving, via the receiver from the second vehicle, a resource reservation indicating at least a first resource of the plurality of resources, and selecting the first radio resource from the plurality of resources based on at least the resource reservation. The apparatus further includes wherein the transmitter is further configured to transmit, to the second vehicle, a transmission grant indicating the first radio resource. The apparatus further includes wherein the information associated with the vehicle platoon includes at least one of a travelling speed of the vehicle platoon or an inter-vehicle distance of the vehicle platoon. The apparatus further includes wherein the transmitter is further configured to transmit the information by transmitting, synchronously with the second vehicle, an identical encoded signal carrying identical information on the first radio resource.

Embodiments of the present disclosure further include a wireless communication device comprising a receiver configured to receive, from a vehicle in a vehicle platoon, a transmission request for synchronous transmission by the vehicle platoon. The wireless communication device further includes a transmitter configured to transmit, to the vehicle, resource allocation information indicating at least one radio resource having a frequency channel and a time period for the synchronous transmission by the vehicle platoon of information associated with the vehicle platoon.

The wireless communication device further includes wherein the at least one radio resource is a dedicated resource for the synchronous transmission. The wireless communication device further includes wherein the resource allocation information further indicates a semi-persistent schedule for the synchronous transmission. The wireless communication device further includes wherein the resource allocation information further indicates a pool of radio resources reserved for any vehicle platooning transmission. The wireless communication device further includes wherein the vehicle is a leading vehicle of the vehicle platoon. The wireless communication device further includes wherein the transmitter is further configured to transmit, to at least one other vehicle in the vehicle platoon, the resource allocation information.

Embodiments of the present disclosure further include a computer-readable medium having program code recorded thereon, the program code comprising code for causing a first vehicle in a vehicle platoon to obtain a first radio resource spanning a frequency channel and a time period for synchronous transmission with at least a second vehicle in the vehicle platoon. The program code further comprises code for causing the first vehicle to transmit, synchronously with at least the second vehicle, information associated with the vehicle platoon in the frequency channel and the time period of the first radio resource. The computer-readable medium further includes wherein the code for obtaining the first radio resource is further configured to transmit, to a wireless communication device, a transmission request for the synchronous transmission, and receive, from the wireless communication device, a transmission grant indicating the first radio resource. The computer-readable medium further includes wherein the transmission grant further indicates a semi-persistent schedule for the first radio resource. The computer-readable medium further includes wherein the code for obtaining the first radio resource is further configured to receive, from a wireless communication device, resource allocation information indicating a plurality of radio resources reserved for vehicle platooning transmissions, and select the first radio resource from the plurality of radio resources. The computer-readable medium further includes code for causing the first vehicle to receive, from the second vehicle, a sensing report, wherein the code for obtaining the first radio resource is further configured to select the first radio resource based on at least the sensing report. The computer-readable medium further includes wherein the sensing report includes channel loading information associated with the second vehicle. The computer-readable medium further includes wherein the code for obtaining the first radio resource is further configured to identify a plurality of resources for the synchronous transmission, transmit, to the second vehicle, resource information associated with the plurality of resources, receive, from the second vehicle, a resource reservation indicating at least a first resource of the plurality of resources, and select the first radio resource from the plurality of resources based on at least the resource reservation. The computer-readable medium further includes code for causing the first vehicle to identify the plurality of resources further based on at least a pseudo-random sequence. The computer-readable medium further includes code for causing the first vehicle to transmit, to the second vehicle, a transmission grant indicating the first radio resource. The computer-readable medium further includes wherein the code for obtaining the first radio resource is further configured to receive, from the second vehicle, a first transmission grant indicating the first radio resource. The computer-readable medium further includes wherein the code for obtaining the first radio resource is further configured to receive, from a wireless communication device, a second transmission grant indicating a second radio resource, determine whether the second radio resource is different from the first radio resource, and select the first radio resource received from the second vehicle when determining that the second radio resource is different from the first radio resource. The computer-readable medium further includes wherein the code for obtaining the first radio resource is further configured to sense on a transmission channel associated with the first vehicle, and transmit, to the second vehicle, a sensing report based on the sensing, wherein the first transmission grant is received in response to the sensing report. The computer-readable medium further includes wherein the code for obtaining the first radio resource is further configured to receive, from the second vehicle, a plurality of resources, and transmit, to the second vehicle, a resource reservation indicating at least a first resource of the plurality of resources, wherein the first transmission grant is received in response to the resource reservation. The computer-readable medium further includes wherein the code for obtaining the first radio resource is further configured to select the first resource from the plurality of resources based on interference from surrounding traffic. The computer-readable medium further includes wherein the information associated with the vehicle platoon includes at least one of a travelling speed of the vehicle platoon or an inter-vehicle distance of the vehicle platoon. The computer-readable medium further includes wherein the code for transmitting the information is further configured to transmit, synchronously with the second vehicle, an identical encoded signal carrying identical information on the first radio resource.

Embodiments of the present disclosure further include a computer-readable medium having program code recorded thereon, the program code comprising code for causing a wireless communication device to receive, from a vehicle in a vehicle platoon, a transmission request for synchronous transmission by the vehicle platoon. The program code further comprises code for causing the wireless communication device to transmit, to the vehicle, resource allocation information indicating at least one radio resource having a frequency channel and a time period for the synchronous transmission by the vehicle platoon of information associated with the vehicle platoon.

The computer-readable medium further includes wherein the at least one radio resource is a dedicated resource for the synchronous transmission. The computer-readable medium further includes wherein the resource allocation information further indicates a semi-persistent schedule for the synchronous transmission. The computer-readable medium further includes wherein the resource allocation information further indicates a pool of radio resources reserved for any vehicle platooning transmission. The computer-readable medium further includes wherein the vehicle is a leading vehicle of the vehicle platoon. The computer-readable medium further includes further comprising code for causing the wireless communication device to transmit, to another vehicle in the vehicle platoon, the resource allocation information. The computer-readable medium further includes further comprising code for causing the wireless communication device to transmit, to all vehicles in the vehicle platoon, the resource allocation information.

Embodiments of the present disclosure further include an apparatus associated with a first vehicle in a vehicle platoon, comprising means for obtaining a first radio resource spanning a frequency channel and a time period for synchronous transmission with at least a second vehicle in the vehicle platoon. The apparatus further includes means for transmitting, synchronously with at least the second vehicle, information associated with the vehicle platoon in the frequency channel and the time period of the first radio resource. The apparatus further includes wherein the means for obtaining the first radio resource is further configured to transmit, to a wireless communication device, a transmission request for the synchronous transmission, and receive, from the wireless communication device, a transmission grant indicating the first radio resource. The apparatus further includes wherein the transmission grant further indicates a semi-persistent schedule for the first radio resource. The apparatus further includes wherein the means for obtaining the first radio resource is further configured to receive, from a wireless communication device, resource allocation information indicating a plurality of radio resources reserved for vehicle platooning transmissions, and select the first radio resource from the plurality of radio resources. The apparatus further includes means receiving, from the second vehicle, a sensing report, wherein the obtaining the first radio resource includes selecting the first radio resource based on at least the sensing report. The apparatus further includes wherein the sensing report includes channel loading information associated with the second vehicle. The apparatus further includes wherein the means for obtaining the first radio resource is further configured to identify a plurality of resources for the synchronous transmission, transmit, to the second vehicle, resource information associated with the plurality of resources, receive, from the second vehicle, a resource reservation indicating at least a first resource of the plurality of resources, and select the first radio resource from the plurality of resources based on at least the resource reservation. The apparatus further includes wherein the means for obtaining the first radio resource is further configured to identify the plurality of resources further based on at least a pseudo-random sequence. The apparatus further includes means for transmitting, to the second vehicle, a transmission grant indicating the first radio resource. The apparatus further includes wherein the means for obtaining the first radio resource is further configured to receive, from the second vehicle, a first transmission grant indicating the first radio resource. The apparatus further includes wherein the means for obtaining the first radio resource further is further configured to receive, from a wireless communication device, a second transmission grant indicating a second radio resource, determine whether the second radio resource is different from the first radio resource, and select the first radio resource received from the second vehicle when determining that the second radio resource is different from the first radio resource. The apparatus further includes wherein the means for obtaining the first radio resource further is further configured to sense on a transmission channel associated with the first vehicle, and transmit, to the second vehicle, a sensing report based on the sensing, wherein the first transmission grant is received in response to the sensing report. The apparatus further includes wherein the means for obtaining the first radio resource further is further configured to receive, from the second vehicle, a plurality of resources, and transmit, to the second vehicle, a resource reservation indicating at least a first resource of the plurality of resources, wherein the first transmission grant is received in response to the resource reservation. The apparatus further includes wherein the means for obtaining the first radio resource is further configured to select the first resource from the plurality of resources based on interference from surrounding traffic. The apparatus further includes wherein the information associated with the vehicle platoon includes at least one of a travelling speed of the vehicle platoon or an inter-vehicle distance of the vehicle platoon. The apparatus further includes wherein the means for transmitting the information is further configured to transmit, synchronously with the second vehicle, an identical encoded signal carrying identical information on the first radio resource.

Embodiments of the present disclosure further include a wireless communication device, comprising means for receiving, from a vehicle in a vehicle platoon, a transmission request for synchronous transmission by the vehicle platoon. The wireless communication device further includes means for transmitting, to the vehicle, resource allocation information indicating at least one radio resource having a frequency channel and a time period for the synchronous transmission by the vehicle platoon of information associated with the vehicle platoon.

The wireless communication device further includes wherein the at least one radio resource is a dedicated resource for the synchronous transmission. The wireless communication device further includes wherein the resource allocation information further indicates a semi-persistent schedule for the synchronous transmission. The wireless communication device further includes wherein the resource allocation information further indicates a pool of radio resources reserved for any vehicle platooning transmission. The wireless communication device further includes wherein the vehicle is a leading vehicle of the vehicle platoon. The wireless communication device further includes means for transmitting, to another vehicle in the vehicle platoon, the resource allocation information. The wireless communication device further includes means for transmitting, to all vehicles in the vehicle platoon, the resource allocation information. Other means embodiments may also include the other discussed system, device, and method features discussed in this disclosure.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication for vehicle platooning, comprising:
   transmitting, by a first vehicle in a vehicle platoon to a base station (BS), a scheduling request for synchronous broadcast of platoon information by the first vehicle with a second vehicle in the vehicle platoon;
   receiving, by the first vehicle from the BS in response to the scheduling request, resource allocation information indicating at least a first radio resource spanning a frequency channel and a time period for the synchronous broadcast; and
   transmitting, by the first vehicle, a first signal including the platoon information in synchronization with a second signal including the platoon information transmitted by the second vehicle in the same frequency channel and the same time period of the first radio resource for the synchronous broadcast, wherein the transmitting the platoon information includes transmitting, by the first vehicle synchronously with the second vehicle on the first radio resource, identical encoded information including at least one of a speed, a platoon size, or an inter-vehicle distance associated with the vehicle platoon.

2. The method of claim 1, wherein the resource allocation information further indicates a semi-persistent schedule for the first radio resource.

3. The method of claim 1, wherein the resource allocation information further indicates a plurality of radio resources reserved for vehicle platooning transmissions, the plurality of radio resources including the first radio resource, and wherein the method further comprises:
   selecting the first radio resource from the plurality of radio resources.

4. The method of claim 1, wherein the resource allocation information further indicates a plurality of radio resources including the first radio resource, and wherein the method further comprises:
   identifying the first radio resource from the plurality of radio resources based on at least a pseudo-random sequence.

5. The method of claim 1, further comprising transmitting, by the first vehicle to the second vehicle, a transmission grant indicating the first radio resource.

6. A method of wireless communication for vehicle platooning, comprising:
   receiving, by a base station (BS) from a first vehicle in a vehicle platoon, a scheduling request for synchronous broadcast of platoon information by the first vehicle and a second vehicle in the vehicle platoon; and
   transmitting, by the BS to the first vehicle in response to the scheduling request, resource allocation information indicating at least a first radio resource having a frequency channel and a time period, the first radio resource allocated for at least the first vehicle and the second vehicle to synchronously transmit identical encoded information including at least one of a speed, a platoon size, or an inter-vehicle distance associated with the vehicle platoon in the same frequency channel and the same time period for the synchronous broadcast.

7. The method of claim 6, further comprising identifying, by the BS, the at least the first radio resource from a dedicated resource for the synchronous broadcast.

8. The method of claim 6, further comprising configuring, by the BS, the resource allocation information to indicate a semi-persistent schedule for the synchronous broadcast.

9. The method of claim 6, further comprising configuring, by the BS, the resource allocation information to indicate a pool of radio resources reserved for any vehicle platooning transmission.

10. The method of claim 6, wherein the first vehicle is a leading vehicle of the vehicle platoon.

11. The method of claim 6, further comprising transmitting, by the BS to at least one other vehicle in the vehicle platoon, the resource allocation information.

12. An apparatus associated with a first vehicle in a vehicle platoon, comprising:
    a transmitter configured to transmit, to a base station (BS), a scheduling request for synchronous broadcast of platoon information by the first vehicle with a second vehicle in the vehicle platoon; and
    a receiver configured to receive, from the BS in response to the scheduling request, resource allocation information indicating at least a first radio resource spanning a frequency channel and a time period for the synchronous broadcast,
    wherein the transmitter is further configured to transmit a first signal including the platoon information in synchronization with a second signal including the platoon information transmitted by the second vehicle in the same frequency channel and the same time period of the first radio resource for the synchronous broadcast, wherein the transmitter configured to transmit the platoon information is configured to transmit, synchronously with the second vehicle on the first radio resource, identical encoded information including at least one of a speed, a platoon size, or an inter-vehicle distance associated with the vehicle platoon.

13. The apparatus of claim 12, wherein the resource allocation information further indicates a semi-persistent schedule for the first radio resource.

14. The apparatus of claim 12, wherein the resource allocation information further indicates a plurality of radio resources reserved for vehicle platooning transmissions, the plurality of radio resources including the first radio resource, and wherein the apparatus further comprises:
    a processor configured to select the first radio resource from the plurality of radio resources.

15. The apparatus of claim 12, wherein the resource allocation information further indicates a plurality of radio resources including the first radio resource, and wherein the apparatus further comprises:
a processor configured to identify the first radio resource from the plurality of radio resources based on at least a pseudo-random sequence.

16. The apparatus of claim 12, wherein the transmitter is further configured to transmit, to the second vehicle, a transmission grant indicating the first radio resource.

17. A base station (BS) comprising:
a receiver configured to receive, from a first vehicle in a vehicle platoon, a scheduling request for synchronous broadcast of platoon information by the first vehicle and a second vehicle in the vehicle platoon; and
a transmitter configured to transmit, to the first vehicle in response to the scheduling request, resource allocation information indicating at least a first radio resource having a frequency channel and a time period, the first radio resource allocated for at least the first vehicle and the second vehicle to synchronously transmit identical encoded information including at least one of a speed, a platoon size, or an inter-vehicle distance associated with the vehicle platoon in the same frequency channel and the same time period for the synchronous broadcast.

18. The BS of claim 17, wherein the at least the first radio resource is a dedicated resource for the synchronous broadcast.

19. The BS of claim 17, wherein the resource allocation information further indicates a semi-persistent schedule for the synchronous broadcast.

20. The BS of claim 17, wherein the resource allocation information further indicates a pool of radio resources reserved for any vehicle platooning transmission.

21. The BS of claim 17, wherein the first vehicle is a leading vehicle of the vehicle platoon.

22. The BS of claim 17, wherein the transmitter is further configured to transmit, to at least one other vehicle in the vehicle platoon, the resource allocation information.

* * * * *